United States Patent [19]

Reilly

[11] Patent Number: 4,700,534
[45] Date of Patent: Oct. 20, 1987

[54] BLOWER ATTACHMENT

[75] Inventor: Roger D. Reilly, Beaver Dam, Wis.

[73] Assignee: Deere & Company, Moline, Ill.

[21] Appl. No.: 894,179

[22] Filed: Aug. 7, 1986

[51] Int. Cl.⁴ .................... A01D 34/82; A01D 34/63
[52] U.S. Cl. .................................. 56/13.3; 56/10.7; 56/16.6
[58] Field of Search ...................... 56/13.3, 12.8, 16.6, 56/202, 10.7, 10.4

[56] References Cited

U.S. PATENT DOCUMENTS

| 3,061,996 | 11/1962 | Ripps | 56/10.7 |
|---|---|---|---|
| 3,624,698 | 11/1971 | Storm | 56/10.7 |
| 3,653,193 | 4/1972 | Coughran, Jr. | 56/10.7 |
| 3,665,685 | 5/1972 | Allard | 56/10.4 |
| 3,949,539 | 4/1976 | Cartner | 56/10.7 |
| 4,183,195 | 1/1980 | James | 56/10.4 |
| 4,193,249 | 3/1980 | Tackett | 56/16.6 |
| 4,206,580 | 6/1980 | Truax et al. | 56/10.4 |
| 4,502,269 | 3/1985 | Cartner | 56/10.7 |

Primary Examiner—Paul J. Hirsch

[57] ABSTRACT

A mounting structure for supporting a power module at least partially outboard of the wheels of a tractor comprising a subframe detachably mounted on the tractor frame between its front and rear wheels and extending transversely outwardly from the tractor toward the module and terminating inboard of the outer sides of the tractor wheels. The subframe has vertical aligned and vertical spaced horizontal ledges thereon. A complementary subframe is fixed to the module outboard of the tractor wheels and has vertically aligned transversely extending horizontal platforms that are vertically spaced on the order of the vertical spacing of the ledges. The ledges and the platforms are in transverse overlap position with respect to each other. Vertically aligned vertical sockets are provided on the module subframe and matching vertically aligned pins are provided on the tractor subframe and the module subframe may swing about a vertical axis of when the pins are inserted into the sockets. A shear pin is provided to connect the platform and ledges and prevents swiveling action about the axis of the matching sockets and pins.

7 Claims, 3 Drawing Figures

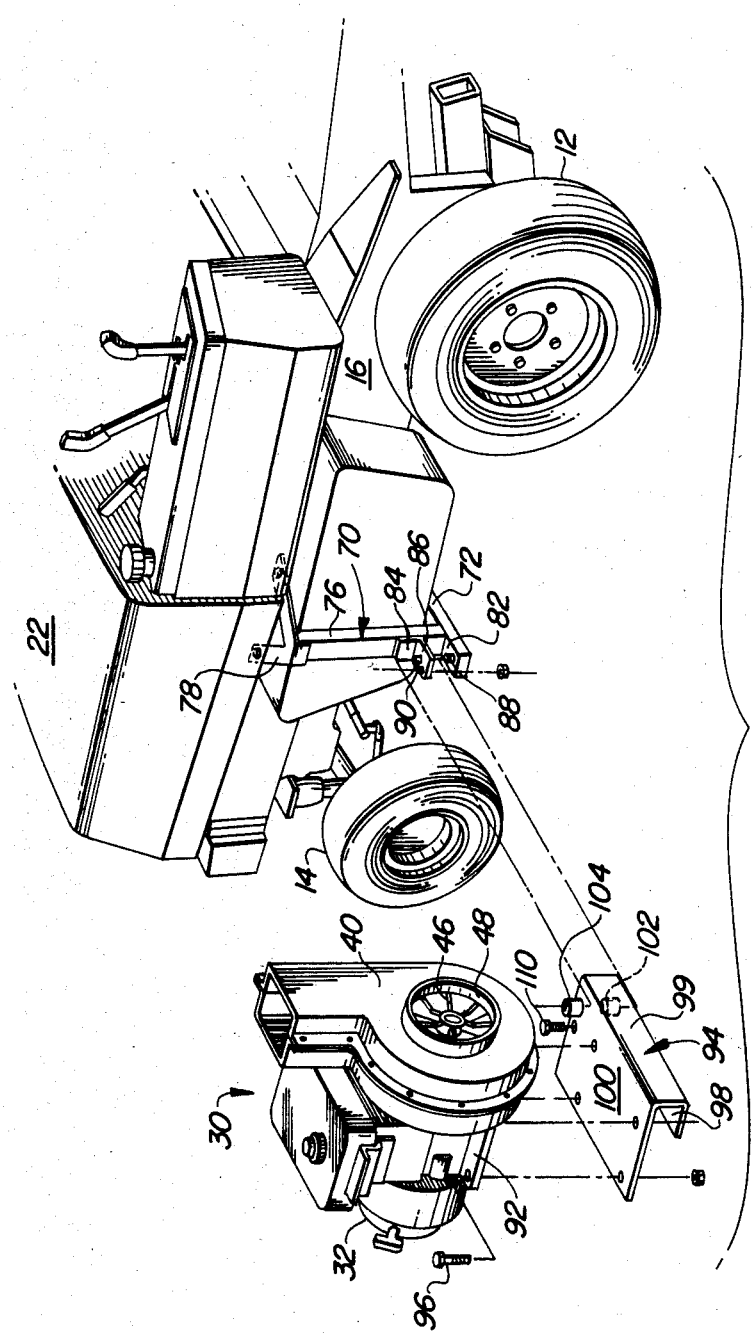

BLOWER ATTACHMENT

BACKGROUND OF THE INVENTION

On lawn and garden tractors, there is often mounted a relatively large mower deck utilizing three or more spindles. In some instances it is desirable to discharge the grass back onto the ground. However, in other instances it is desirable to collect the grass clippings and to move them into a collector normally mounted on the rear of the tractor. When the latter is desired, the volume of grass being discharged by the mower is such that it requires that it be impelled by an auxiliary blower system in order to move it upwardly and rearwardly to the container. When the volume of grass is extremely large or when it is in extremely green condition, the blower must be of such size that it will require an auxiliary engine or motor to run the blower and to move the grass. Generally the module consisting of the blower and its auxiliary engine is mounted on one side of the tractor and at least part of the module will extend beyond the outboard side of the tractor wheels. In typical fashion the mower will move the grass to an intake side of the blower and the blower will then move the grass upwardly and rearwardly to the waiting container. Since most lawn and garden tractors are relatively small, the additional equipment of the module and the container serves as obstructions when they are not needed. It is therefore desirable to remove both when they are not needed. The auxiliary engine is generally heavy and requires a sizable frame structure for mounting it on the tractor. Also, since it projects outwardly of the tractor wheels and since smaller tractors generally have high maneuverability, the entire module can often be accidentally damaged through a quick turn or a fast reverse action by the tractor. Also in commercial mowing there may be several tractors used, only part of which requires the module. Consequently it may be desirable to move the module from tractor to tractor as the demand for the module is needed. Also, since the module is a relatively expensive item, it is desirable that a single module be utilized for several tractor and mower systems as it may be required. Thus, the owner of a series of tractors in commercial mowing may have only one module for use on several tractors.

BRIEF DESCRIPTION OF THE INVENTION

With the above in mind it is a primary object of the present invention to provide a simple means for mounting a blower module on the side of a tractor which makes it relatively easy to move the module on and off the tractor. Also, it is an object of the present invention to provide in the supporting mechanism for the module, a shear pin type of connection which will permit the module to swing about a vertical axis, but not dismount the module, should the tractor inadvertently move the module into contact with a foreign object such as a tree or post.

More specifically it is the purpose of the present invention to provide a detachable subframe on the tractor that has vertically spaced horizontal ledges thereon. A complementary subframe is supplied with the module and its auxiliary engine that has inwardly projecting horizontal platforms that are spaced on the order of the ledges so that the ledges and platforms may overlap. The ledges contain upwardly projecting and vertically aligned pins that are received in vertically aligned sockets on the platforms so as to retain the platform and ledges in overlapping, but unless otherwise restricted in a condition in which they may swivel about the axis of the pins and ledges. Also connecting at least one of the platform and ledges is a vertical shear pin that is spaced from the axis of the sockets and pins so that should the module strike an object, the shear pin will fail and the module may swing about the axis of the pins and sockets.

BRIEF DESCRIPTION OF THE DRAWINGS

FIG. 2 is a perspective exploded view showing a portion of the tractor, the blower and auxiliary engine and a part of the frame support for the blower and engine module.

DESCRIPTION OF THE PREFERRED EMBODIMENT

Figure 1:
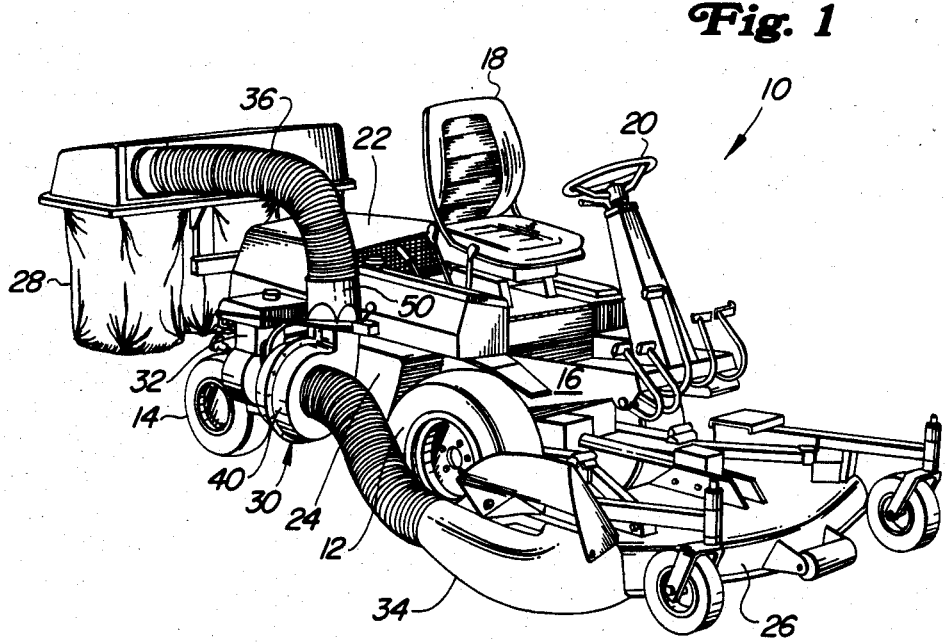
FIG. 1 is a front perspective view of a tractor having a front mounted mower, a module that includes a blower and auxiliary engine for moving grass clippings, a rear mounted container, and the required duct work.
Figure 3:
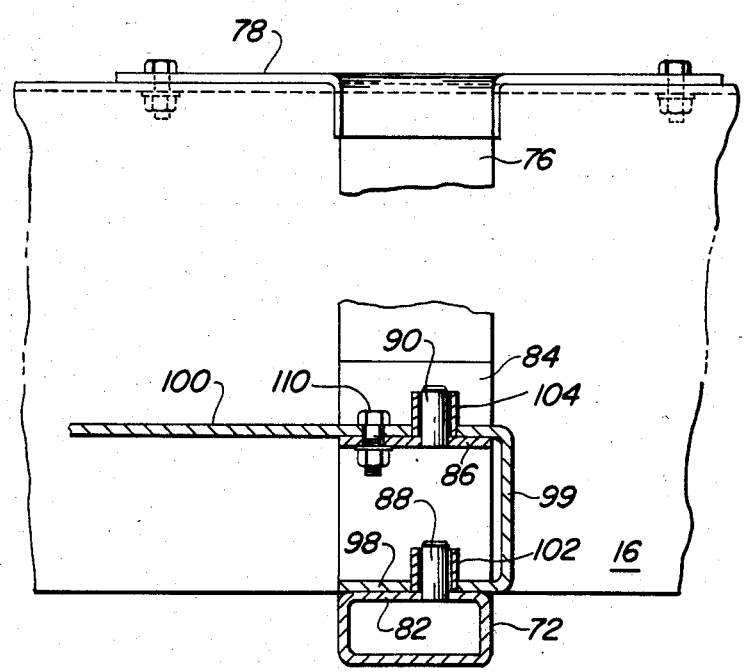
FIG. 3 is a sectional view taken along a vertical fore and extending plane through portions of the frame structure supporting the module and through a pin and socket connection.

A tractor 10 is provided with front traction wheels 12 and rear steerable wheels 14. The wheels 12, 14 support a main fore-and-aft extending frame, indicated in entirety by the reference numeral 16. Carried on the front of the frame 16 is an operator station indicated by the seat 18 and the steering wheel 20. Carried on the rear of the frame 16 is an engine carried under the engine styling 22. A gasoline tank 24 is carried on the side of the frame 16 generally in the mid portion of the frame. Carried on the forward end of the tractor 10 is a mower deck, indicated in its entirety by the reference numeral 26, which has a side discharge. A container 28 for collecting grass clippings from the mower 26 is mounted on the rear end of the tractor 16. Although not shown in detail, such containers may be mounted on a tractor by structure which makes the container 28 easily detachable from the tractor. An auxiliary blower 30 and an engine 32 for operating the blower is provided and mounted on the mid portion of the tractor frame 16 between the front and rear wheels 12, 14. A duct work 34 is provided on the outerside of the mower 26 and feeds to the intake side of the blower 30. A discharge duct 36 is provided on the discharge side of the blower 30 and moves grass from the blower to the container 28. Such ducts are easily attached to and detached from the blower 30, container 28 and mower 26.

Referring now to FIG. 2, the blower 30 is composed of a blower housing 40 that houses a rotor 46. The housing 40 has a side inlet 48 that receives material from the duct 34 and moves it into contact with the blades of the rotor 46. The housing has an upper discharge outlet 50 which receives the forward end of the duct 36.

The engine 32 is connected directly to the housing 40 by means of bolts, not shown. A horizontal drive shaft, also not shown, projects from the forward side of the engine 32 through an opening in the rear side of the housing 40. The drive shaft is keyed to the rotor 46. When the housing 40 and the blower 30 are so connected they become a single power module for blowing grass clippings.

A tractor subframe, indicated in its entirety by the reference numeral 70, is supported on the tractor tractor frame 16 between the wheels 12, 14. The frame 70 projects outwardly from the tractor and terminates generally between but not outboard of the traction wheels. The frame 70 is composed of a transverse horizontal main beam 72 that projects under and is bolted to the tractor frame. On the outer end of the beam 72 is an upwardly projecting beam 76. At tne uppermost end of the beam 76 is a V-shaped horizontal plate member 78 that projects over the gas tank 24 and is suitably bolted to the upper side of the frame 16. The upper V-shaped plate 78 has diverging legs and consequently, rigidifies the entire subframe on the tractor frame. The transverse lower beam 72 projects outwardly beyond the sub-beam 76 to provide on its upper surface a ledge 82. Positioned above the ledge 82 is an L-shaped bracket 84 that has a horizontal portion 86 that projects outwardly and is vertically aligned with the ledge 82. The horizontal portion 86 forms an upper horizontal ledge complementary to the ledge 82. Projecting upwardly from the respective ledges 82, 86 are vertically directed pins 88, 90 respectively.

The engine 32 has a lower pedestal with outwardly projecting flanges 92 that sits on top of a module subframe, indicated in its entirety by the reference numeral 94. The pedestal flanges 92 are bolted to the subframe 94 by means of bolts 96. The subframe 94 is composed of a generally U-shaped flange that opens rearwardly and has upper and lower plate portions 98, 100 that are interconnected by a vertical flange 99. The plates or flanges 98, 100 are horizontal and parallel to one another and serve as platforms that are equally vertically spaced as the ledges 82, 86 and which, when mounted on the subframe 72 are in overlapping position with those ledges. The platforms 98, 100 have welded or otherwise fixed thereto upwardly projecting sockets 102, 104 that are vertically aligned and which receive the pins 88, 90 when the subframe 94 is positioned on the subframe 72. The combined vertical length of the socket 104 and the pin 88 is less than the spacing between the ledges 82, 86 and/or the vertical spacing between the platforms 98, 100. This permits the subframe 94 and the entire module composed of the blower 30 and the engine 32 to be moved to and from the mounted position on the pins 88, 90 and their respective ledges 82, 86. By raising the frame 94 to a position in which the sockets 102, 104 clear the pins 88, 90, the subframe 94 may be moved to and from overlapping position with respect to the subframe 70.

Positioned a short distance rearwardly of the axis of the pins and their respective sockets are aligned openings in the upper platform 98 and the upper ledge 86. A shear bolt 110 is received and may be inserted into the openings in the ledge 86 and platform 100. The shear pin or bolt 110 serves two purposes. First, should the blower 30 or its engine module, which will be positioned at least partially outboard of the right traction wheel 12 and right steering wheel 14 strike some sort of a rigid object, the pin 33 will shear and the entire module and frame 94 may swivel on the pins 88, 90. Second, the bolt 110 when it is threaded into the opening of the ledge 86 holds the platform 98 rigidly on the ledge 86 so that accidental lifting of the frame 94 cannot occur. In operation, the module consisting of the blower 30, its engine 32 and the subframe 94 is mounted on the tractor subframe 70 by raising the module until the sockets are vertically aligned with the pins 88, 90 and then dropping the subframe on the pins 88, 90. The bolt 110 is then tightened down so that the module and its subframe is fixed on the respective ledges 82, 86. The shear pin 110 will rigidify the entire structure and support the module and its subframe generally in cantilever fashion from the side of the tractor. Should it be desired to remove the module, the shear pin 110 is removed and the entire subframe 94 moved vertically until the sockets 102, 104 clear the pins 88, 90.

I claim:

1. Mounting structure for supporting a power module on the side of a tractor having a main frame comprising: a subframe detachably mounted on the tractor frame and extending transversely outwardly from the tractor toward the module, said subframe having vertically aligned and vertically spaced horizontal ledges thereon; a complementary subframe fixed to the module and having vertically aligned, transversely extending horizontal platforms that are vertically spaced of the order of the vertical spacing of the ledges, said ledges and said platforms being in transverse overlap positions with respect to each other; matching vertically aligned vertical sockets and vertically aligned vertical pins supported on the ledges and platforms, the combined vertical lengths of each matching socket and pin being less than the vertical spacing between the ledges and platforms whereby each matching socket and pin may be vertically separated to permit said ledges and platforms to move to and from their overlapping positions; and a shear pin spaced from the axis of said sockets and pins and connecting at least one of said ledges to at least one of said platforms to prevent swiveling action therebetween about the axis of said matching sockets and pins.

2. Mounting structure for supporting a power module on the side of a tractor having a main frame comprising: a subframe detachably mounted on the tractor frame and extending transversely outwardly from the tractor toward the module, said subframe having vertically aligned and vertically spaced horizontal ledges thereon; a complementary subframe fixed to the module and having vertically aligned, transversely extending horizontal platforms that are vertically spaced on the order of the vertical spacing of the ledges, said ledges and said platforms being in transverse overlap positions with respect to each other; matching vertically aligned vertical sockets and vertically aligned vertical pins supported on the ledges and platforms, the combined vertical lengths of each matching socket and pin being less than the vertical spacing between the ledges and platforms whereby each matching socket and pin may be vertically separated to permit said ledges and platforms to move to and from their overlapping positions; and means preventing swiveling action between said ledges and platforms about the axis of said matching sockets and pins.

3. The invention described in claim 2 in which said means is a shear pin extending between a ledge and overlapping platform.

4. The invention described in claim 3 in which said shear pin is spaced radially from said axis of said matching sockets and pins.

5. The invention described in claim 4 in which said shear pin is a threaded member and carries a nut thereon so that said ledges and platforms are detachably locked against relative vertical movement.

6. The invention described in claim 2 in which said means also prevents relative vertical movement between said platforms and ledges but may be adjusted to permit free vertical movement therebetween so that said ledges and platforms may be moved to and from their overlap positions.

7. Mounting structure for supporting a power module at least partially outboard of the wheels of a tractor having a main frame comprising: a subframe detachably mounted on the tractor frame between its front and rear wheels and extending transversely outwardly from the tractor toward the module but terminating inboard of the outer sides of said tractor wheels, said subframe having vertically aligned and vertically spaced horizontal ledges thereon; a complementary subframe fixed to a module outboard of the tractor wheels and having vertically aligned transversely extending horizontal platforms that are vertically spaced on the order of the vertical spacing of the ledges, said ledges and said platforms being in transverse overlap positions with respect to each other; matching vertically aligned vertical sockets and vertically aligned vertical pins supported on the ledges and platforms, the combined vertical lengths of each matching socket and pin being such that the matching socket and pin may be vertically separated to permit said ledges and platforms to move to and from their overlapping positions; and a shear pin preventing swiveling action between the respective subframe about the axis of said matching sockets and pins.

* * * * *